US012812223B2

(12) United States Patent
Cashen et al.

(10) Patent No.: US 12,812,223 B2
(45) Date of Patent: Nov. 24, 2026

(54) SYSTEMS AND METHODS FOR UTILIZING A SINGLE VEHICLE IMAGE SENSOR OR CAMERA FOR BOTH HUMAN AND MACHINE VISION

(71) Applicant: FCA US LLC, Auburn Hills, MI (US)

(72) Inventors: Daniel Cashen, Troy, MI (US); Emily Robb, Troy, MI (US); Esaias Pech, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 309 days.

(21) Appl. No.: 18/604,719

(22) Filed: Mar. 14, 2024

(65) Prior Publication Data

US 2025/0294228 A1 Sep. 18, 2025

(51) Int. Cl.

| | |
|---|---|
| ***H04N 23/12*** | (2023.01) |
| ***B60W 50/14*** | (2020.01) |
| ***B60W 60/00*** | (2020.01) |
| ***H04N 23/84*** | (2023.01) |
| ***H04N 25/13*** | (2023.01) |
| ***H04N 25/133*** | (2023.01) |

(52) U.S. Cl.

CPC ............ *H04N 23/12* (2023.01); *B60W 50/14* (2013.01); *B60W 60/001* (2020.02); *H04N 23/843* (2023.01); *H04N 25/135* (2023.01); *B60W 2050/146* (2013.01); *B60W 2420/403* (2013.01); *H04N 25/133* (2023.01)

(58) Field of Classification Search

CPC .... H04N 23/12; H04N 23/843; H04N 25/135; H04N 25/133; H04N 25/134; B60W 50/14; B60W 60/001; B60W 2050/146; B60W 2420/403; G06V 10/143; G06V 10/147; G06V 20/56

See application file for complete search history.

(56) References Cited

U.S. PATENT DOCUMENTS

| | | | | |
|---|---|---|---|---|
| 10,275,855 | B2 * | 4/2019 | Price ...................... | H04N 23/11 |
| 10,829,044 | B2 | 11/2020 | Tatara et al. | |
| 11,842,699 | B2 | 12/2023 | Wyatt | |

(Continued)

OTHER PUBLICATIONS

Weikl, Korbinian, et al., "Optimization of Automotive Color Filter Arrays for Traffic Light Color Separation", Society for Imaging Science and Technology; p. 288-292. http://doi.org/10.2352/issn.2169-2629.2020.28.46.

*Primary Examiner* — Gevell V Selby
(74) *Attorney, Agent, or Firm* — Jeremy J. Klobucar

(57) ABSTRACT

A vehicle camera system configured for both human vision and machine vision functionality includes an image sensor defining an array of photovoltaic cells each configured to detect light and output an unfiltered array of light samples, a red/green/clear/blue (RGCB) color filter array (CFA) configured to color filter the unfiltered array of light samples and output an array of color samples, and a control system configured to apply a first interpretation technique to the array of color samples to obtain a human vision image and apply a different second interpretation technique to the array of color samples to obtain a machine vision image having a reduced color space and improved transmittance compared to the human vision image, wherein the second interpretation technique involves utilizing each clear value as a luminance value in the determination of red/green/blue values for each color sample.

12 Claims, 3 Drawing Sheets

(56) References Cited

U.S. PATENT DOCUMENTS

| | | | | |
|---|---|---|---|---|
| 2015/0210278 | A1* | 7/2015 | Ben Shalom .......... | H04N 7/181<br>382/104 |
| 2018/0041724 | A1* | 2/2018 | Kim ..................... | H04N 25/583 |
| 2020/0154088 | A1* | 5/2020 | Otsubo ................ | H04N 25/135 |
| 2022/0264041 | A1 | 8/2022 | Murozuka | |
| 2022/0272302 | A1 | 8/2022 | Nakamura | |
| 2022/0283442 | A1* | 9/2022 | Lee ........................ | H04N 23/11 |

* cited by examiner

SYSTEMS AND METHODS FOR UTILIZING A SINGLE VEHICLE IMAGE SENSOR OR CAMERA FOR BOTH HUMAN AND MACHINE VISION

FIELD

The present application generally relates to vehicle image sensors or cameras and, more particularly, to systems and methods for utilizing a single vehicle image sensor or camera for both human and machine vision.

BACKGROUND

A digital camera consists of an image sensor (CCD, CMOS, etc.) and a color filter array (CFA). The image sensor defines an array of photovoltaic cells that are each configured to detect light, and the CFA defines a mosaic or matrix of different color filters. The most common CFA for digital imagery is the Bayer filter, which is based on a 2×2 grid of red/green/green/blue ("RGGB") filters, with green (G) being present twice as green best corresponds to sharper images as observed by the human eye. For machine vision applications, such as on vehicles, different CFAs are often utilized as the images are never shown/displayed to the user. These different CFAs (e.g., a 2×2 based grid of red/yellow/yellow/cyan, or "RYYCy") reduce the color space to improve transmittance or low-light performance, which in turn can result in better machine vision performance. Having separate cameras for human and machine vision functionality, however, is duplicative and increases costs. Accordingly, while such conventional vehicle camera systems do work for their intended purpose, there exists an opportunity for improvement in the relevant art.

SUMMARY

According to one example aspect of the invention, a camera system for a vehicle, the camera system being configured for both human vision and machine vision functionality is illustrated. In one exemplary implementation, the camera system comprises an image sensor defining an array of photovoltaic cells each configured to detect light and output an unfiltered array of light samples, a red/green/clear/blue (RGCB) color filter array (CFA) configured to color filter the unfiltered array of light samples and output an array of color samples, and a control system configured to apply a first interpretation technique to the array of color samples to obtain a human vision image, apply a different second interpretation technique to the array of color samples to obtain a machine vision image having a reduced color space and improved transmittance compared to the human vision image, wherein the second interpretation technique involves utilizing each clear value as a luminance value in the determination of red/green/blue values for each color sample, and output the human vision and machine vision images to respective vehicle systems for user display and use by an autonomous driving feature.

In some implementations, the machine vision image is substantially similar to a red/yellow/yellow/cyan (RYYCy) filtered and reconstructed image from the array of light samples. In some implementations, the autonomous driving feature includes object detection and classification. In some implementations, the human vision image is substantially similar to a red/green/green/blue (RGGB) filtered and reconstructed image from the array of light samples. In some implementations, the camera system consists of the image sensor and the RGBC CFA and is configured to generate and output both the human vision and machine vision images. In some implementations, the image sensor is one of a charged-couple device (CCD) and a complimentary metal-oxide-semiconductor (CMOS) device with an active pixel array. In some implementations, the first and second interpretation techniques are different demosaicing or color reconstruction algorithms.

According to another example aspect of the invention, a method for utilizing a single vehicle camera system for both human vision and machine vision functionality is presented. In one exemplary implementation, the method comprises providing a camera system of a vehicle, the camera system comprising an image sensor defining an array of photovoltaic cells each configured to detect light and output an unfiltered array of light samples and an RGCB CFA configured to color filter the unfiltered array of light samples and output an array of color samples, applying, by a control system, a first interpretation technique to the array of color samples to obtain a human vision image, applying, by the control system, a different second interpretation technique to the array of color samples to obtain a machine vision image having a reduced color space and improved transmittance compared to the human vision image, wherein the second interpretation technique involves utilizing each clear value as a luminance value in the determination of red/green/blue values for each color sample, and outputting, by the control system, the human vision and machine vision images to respective vehicle systems for user display and use by an autonomous driving feature.

In some implementations, the machine vision image is substantially similar to an RYYCy filtered and reconstructed image from the array of light samples. In some implementations, the autonomous driving feature includes object detection and classification. In some implementations, the human vision image is substantially similar to an RGGB filtered and reconstructed image from the array of light samples. In some implementations, the camera system consists of the image sensor and the RGBC CFA and is configured to generate and output both the human vision and machine vision images. In some implementations, the image sensor is one of a CCD and a CMOS device with an active pixel array. In some implementations, the first and second interpretation techniques are different demosaicing or color reconstruction algorithms.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, for machine vision applications, such as on vehicles, different color filter arrays (CFAs) are often utilized as the images are never shown/displayed to the user. Having separate cameras for human and machine vision functionality, however, is duplicative and increases costs. Accordingly, improved techniques are presented herein that utilize a single image sensor (camera) with red/green/clear/blue (RGCB) CFA (also referred to as red/green/white/blue, or RGWB) and two different interpretation or "demosaicing" techniques for obtaining a human vision image and a machine vision image, respectively. The term "demosaicing" as used herein, also known as "color reconstruction," refers to a digital image processing algorithm for reconstructing a full color image from incomplete color samples output from an image sensor with an overlaid CFA. These techniques generally involve utilizing the clear/white value as a luminance value for consideration in interpreting the RGB values. In other words, the RGCB CFA is able to produce a human vision image having similar quality as an RGGB filtered image, while also producing a machine vision image having similar quality as a RYYCy filtered image. The benefit of these techniques is reduced vehicle costs (as well as complexity/packaging) by being able to utilize a single for both human and machine vision functionality.

Figure 1A:
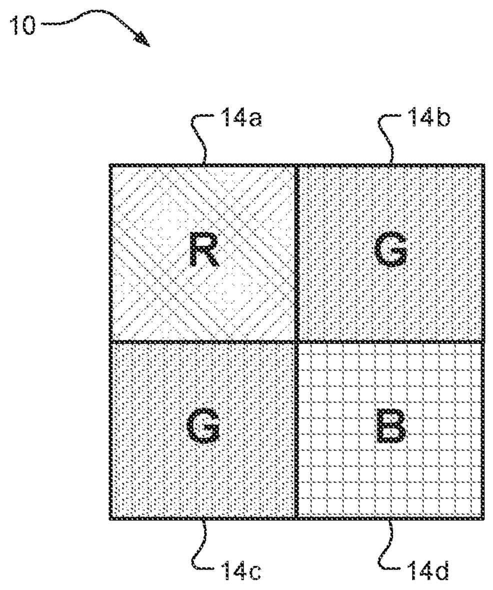
FIG. 1A (PRIOR ART)
FIGS. 1A-1C illustrate portions of RGGB and RYYCy color filter arrays (CFAs) for image sensors of digital cameras according to the prior art and a portion of a RGCB CFA according to the principles of the present application.
Figure 1B:
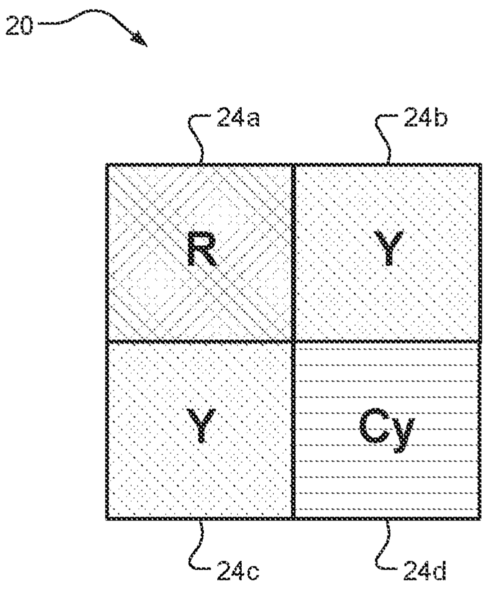
FIG. 1B (PRIOR ART)
Figure 1C:
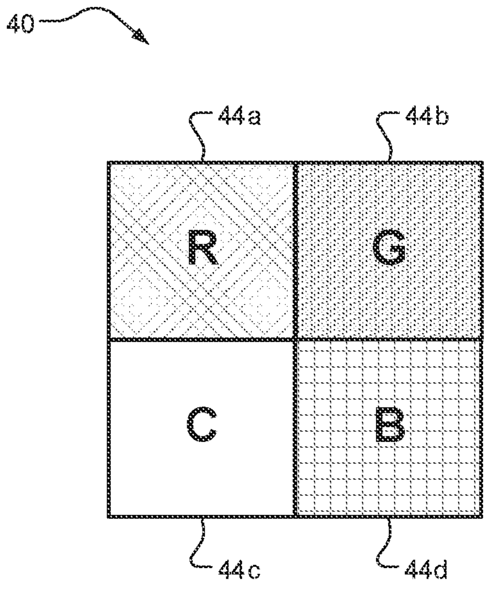

Referring now to FIGS. 1A-1C, portions of RGGB and RYYCy CFAs 10 and 20, respectively, for image sensors of digital cameras according to the prior art and a portion of a RGCB or RGWB CFA 40 according to the principles of the present application are illustrated. It will be appreciated that while the smallest representations of portions of these CFAs 10, 20, 40 are illustrated as 2×2 mosaics or grids, the actual size of the CFAs that are applied to an array of light samples will be much larger (e.g., millions of total pixels). FIG. 1A illustrates a conventional RGGB or Bayer CFA 10 for human vision, which has one red filter 14*a*, one blue filter 14*d*, and two diagonally-opposed green filters 14*b*, 14*c*. As previously discussed, the duplicative green filters 14*b* and 14*c* are due to the color green best corresponding to sharper images as observed by the human eye. FIG. 1B, on the other hand, illustrates a conventional RYYCy CFA 20 for machine vision, which has one red filter 24*a*, one cyan filter 24*d*, and two diagonally-opposed yellow filters 24*b*, 24*c*. This color pattern produces color samples having less overall blue coloring and improved luminance (and thus low-light performance), which is better for machine vision applications.

In FIG. 1C, a portion of an example RGCB or RGWB CFA 40 according to the principles of the present application is illustrated. As shown, there is one red filter 44*a*, one green filter 44*b*, one clear (or white) filter 44*c*, and one blue filter 44*d*. The clear filter 44*c*, being clear, will not produce a color sample for that particular pixel. However, parameters of the light sample that passes through the clear filter 44*c*, such as a luminance value, can be leveraged. More specifically, this luminance value can be used in the interpretation of the R/G/B or R/Y/Cy color values for the pixels corresponding to each of the red filter 44*a*, the green filter 44*b*, and the blue filter 44*d*. The R/G/B or R/Y/Cy color values from these neighboring pixels can also be utilized to determine or estimate R/G/B or R/Y/Cy color values for the pixel corresponding to the clear filter 44*c*. Thus, by utilizing this single CFA 40 with different interpretation techniques (e.g., demosaicing or color reconstruction algorithms), both high or at least acceptable quality human vision and machine vision images for the desired vehicle applications are obtainable using the same camera 128 or image sensor 132.

Figure 2:
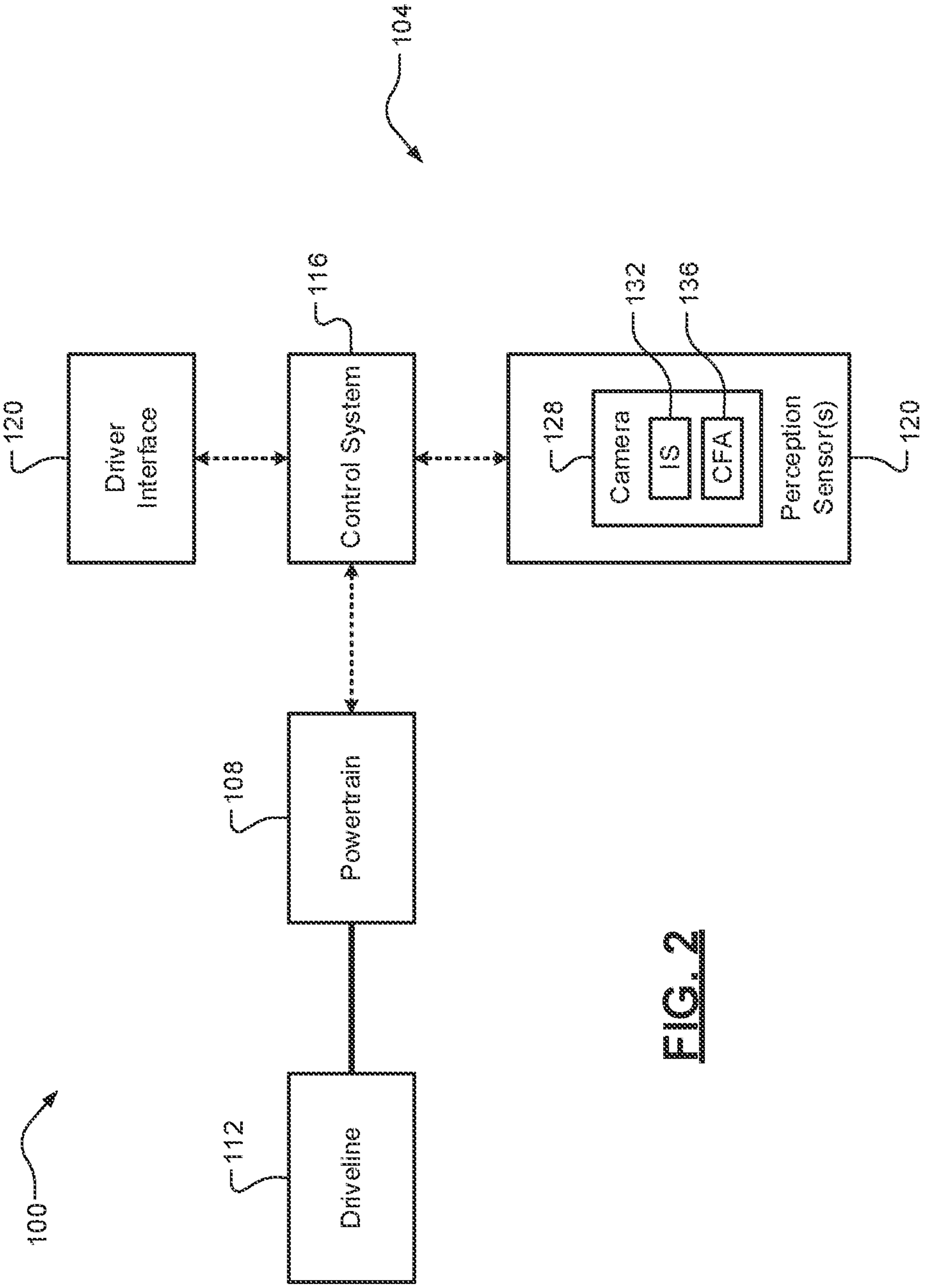
FIG. 2 is a functional block diagram of a vehicle having an example camera system configured for both human vision and machine vision according to the principles of the present application.

Referring now to FIG. 2, a functional block diagram of a vehicle 100 having an example camera system 104 configured for obtaining both human vision and machine vision images according to the principles of the present application is illustrated. The vehicle 100 generally comprises a powertrain 108 (an engine, an electric motor, some combination thereof, etc.) that is configured to generate and transfer torque to a driveline 112 for vehicle propulsion. A control system 116 controls operation of the vehicle 100, including primarily controlling the powertrain 108 to generate and transfer to the driveline 112 a desired amount of torque to satisfy a driver torque request. The driver torque request is received by the control system 116 from a driver interface 120, which could include an accelerator pedal and any other suitable driver input/output systems (e.g., a display configured to display the driver a human vision image relative to the vehicle 100). The control system 116 is also configured to communicate with a set of perception sensors 124, which includes a camera 128 of the camera system 104 according to the principles of the present application.

The perception sensor(s) 124 could also include other suitable systems/sensors (RADAR sensors, LIDAR sensors, etc.) that are utilized for executing one or more advanced driver assistance (ADAS) or autonomous driving features of the vehicle 100. This could include, for example only, object detection and classification in machine vision images obtained by the camera system 104. Non-limiting examples of the autonomous driving feature(s) of the vehicle 100 include adaptive cruise control (ACC), automated lane keeping or centering, automated lane changing, and collision avoidance. While these are merely some example features, it will be appreciated that the machine vision images obtained by the camera system 104 could be utilized for any suitable level one (L1) through level five (L5) fully autonomous driving of the vehicle 100. As shown, the camera 128 includes an image sensor (IS) 132 (e.g., a CCD or CMOS-based device) having a RGCB or RGWB CFA 136 (e.g., similar to the CFA 40 of FIG. 1) overlaid thereon. The image sensor 132 is configured to detect light and output an array of light samples and the CFA 136 is configured to filter the array of light samples therethrough to produce an array of color samples.

The control system 116 (or a separate controller, such as a microcontroller of a system-on-chip (SOC) package for the camera 128 as part of the camera system 104) is configured to perform processing of the array of color samples to obtain both human vision and machine vision images. First, the control system 116 is configured to apply a first interpretation technique to the array of color samples to obtain the human vision image, similar to the application of a conventional RGGB CFA and color reconstruction thereafter. Second, the control system 116 is configured to apply a different second interpretation technique to the array of color samples to obtain the machine vision image. The machine vision image has a reduced color space and improved transmittance compared to the human vision image, similar to the application of a conventional RYYCy CFA and color reconstruction thereafter. More specifically, this different second interpretation technique involves utilizing each clear value as a luminance value in the determination of red/green/blue values for each color sample. The control system 116 is then configured to output the human vision and machine vision images to respective vehicle systems (e.g., the driver interface 120) for user display and use by an autonomous driving feature (e.g., which could be by the control system 116 itself or another suitable controller).

Figure 3:
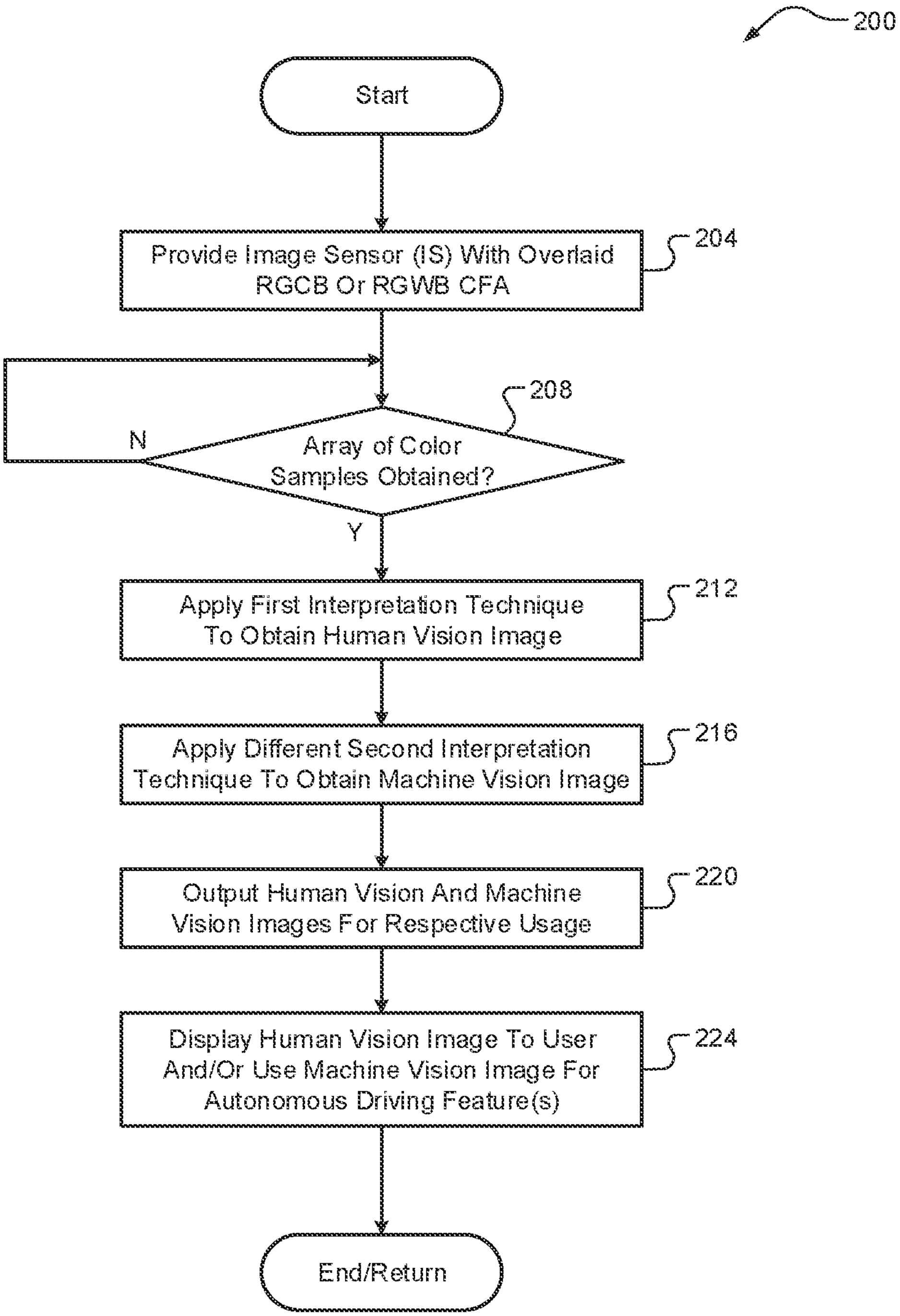
FIG. 3 is a flow diagram of an example method for utilizing a single vehicle camera system for both human vision and machine vision according to the principles of the present application.

Referring now to FIG. 3, a flow diagram of an example method 200 for utilizing a single vehicle camera system for both human vision and machine vision according to the principles of the present application is illustrated. While the vehicle 100 and its components are specifically discussed for descriptive/illustrative purposes, it will be appreciated that the method 200 could be applicable to any suitable vehicle or non-vehicle digital camera system. The method 200 begins at 204 where the camera 128 is provided, which has the image sensor (IS) 132 overlaid with the CFA 136 (e.g., RGCB or RGWB CFA 40 of FIG. 1C). At 208, the control system 116 (or a separate controller, such as a microcontroller of a system-on-chip (SOC) package for the camera 128) determines whether an array of color samples have been obtained by the camera 128. This includes, as discussed in greater detail herein, first capturing an array of light samples using the image sensor (IS) 132 and then filtering the array of light samples through the CFA 136 to obtain the array of color samples.

When false, the method 200 ends or returns to 204 or 208 until digital image capturing and processing begins. When true, the method 200 proceeds to 212. At 212, the control system 116 applies a first interpretation technique (e.g., a first demosaicing or color reconstruction algorithm) to the array of color samples to obtain a human vision image. At 216, which could be performed in parallel with 212 (e.g., parallel processing), the control system 112 applies a different second interpretation technique (e.g., a different second demosaicing or color reconstruction algorithm) to the array of color samples to obtain a machine vision image. At 220, the control system 116 outputs the human vision and machine vision images to respective vehicle systems for subsequent usage. This could include, for example only, the control system 116 at 224 displaying the human vision image via the driver interface 120 and/or the control system 116 utilizing the machine vision image for an autonomous driving feature of the vehicle 100 (e.g., object detection and classification within the machine vision image). The method 200 then ends or returns to 204 or 208 for one or more additional cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A camera system for a vehicle, the camera system being configured for both human vision and machine vision functionality, the camera system comprising:
- an image sensor defining an array of photovoltaic cells each configured to detect light and output an unfiltered array of light samples;
- a red/green/clear/blue (RGCB) color filter array (CFA) configured to color filter the unfiltered array of light samples and output an array of color samples; and
- a control system configured to:
  - apply a first interpretation technique to the array of color samples to obtain a human vision image;
  - apply a different second interpretation technique to the array of color samples to obtain a machine vision image having a reduced color space and improved transmittance compared to the human vision image, wherein the second interpretation technique involves utilizing each clear value as a luminance value in the determination of red/green/blue values for each color sample; and
  - output the human vision and machine vision images to respective vehicle systems for user display and use by an autonomous driving feature,
- wherein the first and second interpretation techniques are different demosaicing or color reconstruction algorithms.

2. The camera system of claim 1, wherein the machine vision image is substantially similar to a red/yellow/yellow/cyan (RYYCy) filtered and reconstructed image from the array of light samples.

3. The camera system of claim 1, wherein the autonomous driving feature includes object detection and classification.

4. The camera system of claim 1, wherein the human vision image is substantially similar to a red/green/green/blue (RGGB) filtered and reconstructed image from the array of light samples.

5. The camera system of claim 1, wherein the camera system consists of the image sensor and the RGBC CFA and is configured to generate and output both the human vision and machine vision images.

6. The camera system of claim 1, wherein the image sensor is one of a charged-couple device (CCD) and a complimentary metal-oxide-semiconductor (CMOS) device with an active pixel array.

7. A method for utilizing a single vehicle camera system for both human vision and machine vision functionality, the method comprising:
- providing a camera system of a vehicle, the camera system comprising:
  - an image sensor defining an array of photovoltaic cells each configured to detect light and output an unfiltered array of light samples; and
  - a red/green/clear/blue (RGCB) color filter array (CFA) configured to color filter the unfiltered array of light samples and output an array of color samples;
- applying, by a control system, a first interpretation technique to the array of color samples to obtain a human vision image;
- applying, by the control system, a different second interpretation technique to the array of color samples to obtain a machine vision image having a reduced color space and improved transmittance compared to the human vision image, wherein the second interpretation technique involves utilizing each clear value as a luminance value in the determination of red/green/blue values for each color sample; and outputting, by the control system, the human vision and machine vision images to respective vehicle systems for user display and use by an autonomous driving feature, wherein the first and second interpretation techniques are different demosaicing or color reconstruction algorithms.

8. The method of claim 7, wherein the machine vision image is substantially similar to a red/yellow/yellow/cyan (RYYCy) filtered and reconstructed image from the array of light samples.

9. The method of claim 7, wherein the autonomous driving feature includes object detection and classification.

10. The method of claim 7, wherein the human vision image is substantially similar to a red/green/green/blue (RGGB) filtered and reconstructed image from the array of light samples.

11. The method of claim 10, wherein the camera system consists of the image sensor and the RGBC CFA and is configured to generate and output both the human vision and machine vision images.

12. The method of claim 7, wherein the image sensor is one of a charged-couple device (CCD) and a complimentary metal-oxide-semiconductor (CMOS) device with an active pixel array.

* * * * *